(12) United States Patent
Blanc et al.

(10) Patent No.: US 9,869,398 B2
(45) Date of Patent: Jan. 16, 2018

(54) BRAKING SYSTEM USING A VALVE

(71) Applicant: AIRBUS SAFRAN LAUNCHERS SAS, Issy-les-Moulineaux (FR)

(72) Inventors: Bruno Blanc, Brueil en Vexin (FR); Jesus Llanos Garcia, Vernon (FR); Anthony Caron, Rouen (FR)

(73) Assignee: AIRBUS SAFRAN LAUNCHERS SAS, Issy-les-Moulineaux (FR)

( * ) Notice: Subject to any disclaimer, the term of this patent is extended or adjusted under 35 U.S.C. 154(b) by 0 days.

(21) Appl. No.: 15/246,874

(22) Filed: Aug. 25, 2016

(65) Prior Publication Data
US 2017/0059044 A1 Mar. 2, 2017

(30) Foreign Application Priority Data
Aug. 26, 2015 (FR) ...................... 15 57926

(51) Int. Cl.
| F16K 35/00 | (2006.01) |
| F16K 5/04 | (2006.01) |
| F16K 35/02 | (2006.01) |
| F16K 35/06 | (2006.01) |
| F16K 5/06 | (2006.01) |

(52) U.S. Cl.
CPC .............. *F16K 5/0442* (2013.01); *F16K 5/06* (2013.01); *F16K 5/0647* (2013.01); *F16K 35/00* (2013.01); *F16K 35/022* (2013.01); *F16K 35/06* (2013.01)

(58) Field of Classification Search
CPC ........ F16K 5/0647; F16K 5/06; F16K 5/0442; F16K 35/022; F16K 35/00
USPC .................................... 251/93, 111
See application file for complete search history.

(56) References Cited

U.S. PATENT DOCUMENTS

| 1,153,428 | A | * | 9/1915 | Harvey .................. F16K 35/02 251/111 |
| 1,473,775 | A | * | 11/1923 | Leech, Jr. ............... F16K 35/02 251/93 |
| 1,590,074 | A | * | 6/1926 | Booker .................. F16K 35/02 251/93 |

(Continued)

FOREIGN PATENT DOCUMENTS

WO WO 2012/001552 A1 1/2012

OTHER PUBLICATIONS

INPI Search Report for corresponding French patent application FR 1557926 dated Jun. 28, 2016 (2 pages).

*Primary Examiner* — Umashankar Venkatesan
(74) *Attorney, Agent, or Firm* — Bookoff McAndrews, PLLC

(57) ABSTRACT

A system for blocking a plug valve, the system comprising:
a plug (1) movable in rotation about an axis (Y-Y); and
a blocker part (5);
the system being characterized in that:
the plug (1) presents an index portion having a first ramp (3) and a second ramp (4) that are arranged around the shaft (2) with oppositely-handed slopes; and
the blocker part (5) presents first and second index portions (8, 9) adapted to come selectively into contact with the first and second ramps (3, 4) respectively;
the first ramp (3) and the first index portion (8) serving to prevent the plug (1) from turning about the longitudinal axis (Y-Y) in a first direction of rotation, and the second ramp (4) and the second index portion (9) serving to prevent the plug (1) from turning about the longitudinal axis (Y-Y) in a second direction of rotation.

6 Claims, 1 Drawing Sheet

(56) References Cited

U.S. PATENT DOCUMENTS

| | | | | |
|---|---|---|---|---|
| 3,355,141 A | * | 11/1967 | Cooper | F16K 35/00 |
| | | | | 251/101 |
| 3,429,553 A | | 2/1969 | Smith et al. | |
| 4,484,595 A | * | 11/1984 | Vanek | E03B 9/06 |
| | | | | 137/296 |
| 4,549,716 A | * | 10/1985 | Warren | F16K 31/60 |
| | | | | 192/69.91 |
| 4,577,831 A | * | 3/1986 | DiBartolo | F16K 35/02 |
| | | | | 137/385 |
| 5,513,831 A | * | 5/1996 | Seward | F16K 35/027 |
| | | | | 192/95 |
| 5,595,217 A | * | 1/1997 | Gillen | F16L 37/18 |
| | | | | 137/614.06 |
| 2003/0217571 A1 | * | 11/2003 | Turnau, III | F16K 35/06 |
| | | | | 70/175 |
| 2014/0217319 A1 | | 8/2014 | Brushwood | |

\* cited by examiner

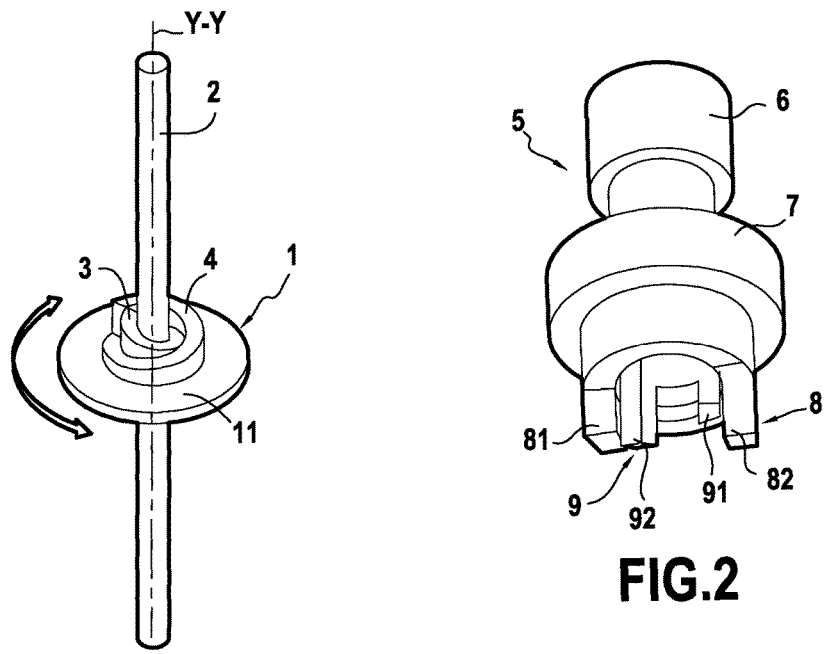
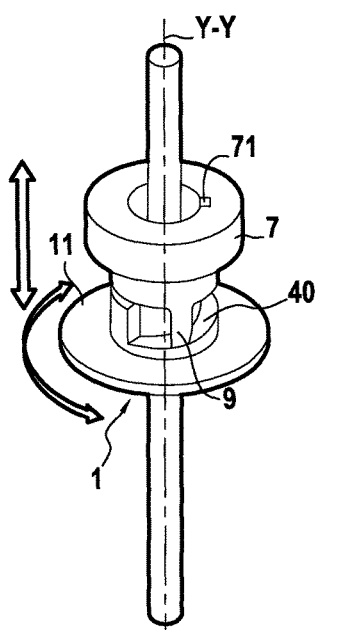
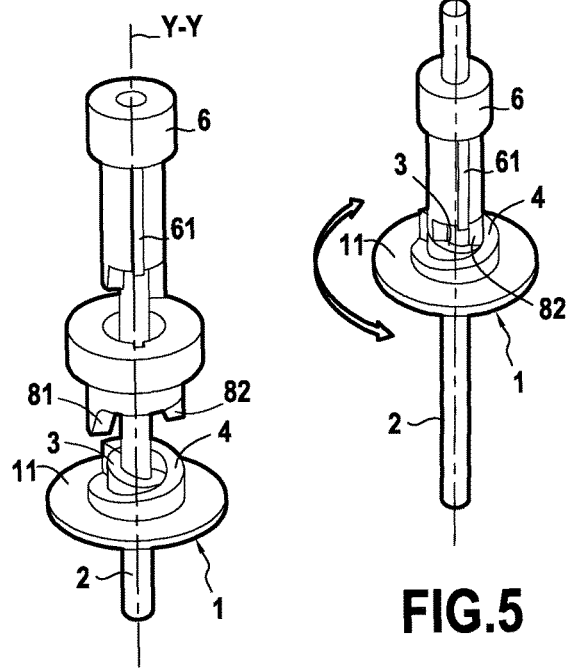

BRAKING SYSTEM USING A VALVE

GENERAL TECHNICAL FIELD

The present invention relates to the field of valves, and more precisely to systems for blocking valves, and it finds a particular application The present invention relates to the field of valves, and more precisely to systems for blocking valves, and it finds a particular application with valves for space vehicle engines.

STATE OF THE ART

In the context of space applications, reliability objectives lead to striving to simplify various components.

It is thus desirable to limit the number of moving parts, in particular for engine valves that are not operated in flight but only during calibration operations on the ground. The various actuators that would be used in conventional manner for controlling such engine valves can thus be omitted in order to simplify the design of the valve.

Nevertheless, the valve is involved during operations of adjusting the engine on the ground, and in particular use is made of its head loss. It is thus necessary to be able to actuate the valve on the ground in order to adjust its head loss and thereby obtain the desired operating point for the engine. It is then necessary to maintain this operating point for the engine during flight, using the same valve but without an actuator.

It is therefore necessary to design an engine valve blocking system that combines a structure that is simple, leaving the plug of the valve free to move while the actuator is mounted on the valve in order to adjust the engine on the ground, with the position of the plug being maintained accurately once the adjustment has been performed and the valve actuator has been removed.

SUMMARY OF THE INVENTION

The present invention seeks to satisfy those problems at least in part, and thus proposes a system for blocking a plug valve, the system comprising:
- a plug that is movable in rotation about a longitudinal axis and that is rotatably connected to a valve body, the plug presenting a shaft extending along the longitudinal axis; and
- a blocker part mounted to be movable in translation along the longitudinal axis;
- the system being characterized in that:
- the plug presents an index portion comprising a first ramp and a second ramp, the two ramps being arranged around the shaft, extending in the same direction and having oppositely-handed slopes about the shaft; and
- the blocker part presents first and second index portions adapted to come selectively into contact with the first and second ramps, respectively;
- the blocker part being configured so as to be capable of being positioned selectively in:
- a free position, in which the blocker part is not in contact with the ramps of the plug; and
- a locking position in which the first and second index portions are respectively in contact with the first and second ramps, such that the first ramp and the first index portion prevent the plug from turning about the longitudinal axis in a first direction of rotation, and the second ramp and the second index portion prevent the plug from turning about the longitudinal axis in a second direction of rotation, opposite to the first direction of rotation.

Typically, the index portion of the plug comprises a plate arranged on the shaft and extending radially around the shaft, the first and second ramps extending over a surface of said plate, said ramps being arranged concentrically around the shaft.

The first index portion may have a contact surface forming a ramp portion that is complementary to the first ramp, and the second index portion may have a contact surface forming a ramp portion complementary to the second ramp.

In a variant, the first index may have two contact surfaces, each forming a ramp portion complementary to the first ramp, and the second index portion may have two contact surfaces, each forming a ramp portion complementary to the second ramp.

The two contact surfaces of the first index portion are then typically arranged on opposite sides of the longitudinal axis, and the two contact surfaces of the second index portion are arranged on opposite sides of the longitudinal axis.

The system may include a mechanism for preventing the blocker part from moving in translation in a longitudinal direction defined by the longitudinal axis.

DESCRIPTION OF THE FIGURES

Other characteristics, objects, and advantages of the invention appear from the following description, which is purely illustrative and non-limiting, and which should be read with reference to the accompanying figures, in which:

FIG. 1 is a view of an example valve plug in an aspect of the invention;

FIG. 2 shows a view of an example of a blocker part for the plug; and

FIGS. 3 to 5 show the interaction between the plug and the blocker part shown in portions 1 and 2.

In all of the figures, elements that are in common are identified by reference numerals that are identical.

DETAILED DESCRIPTION

FIG. 1 shows a view of an example valve plug in an aspect of the invention. This figure shows a plug 1 extending along a longitudinal axis Y-Y, the plug 1 being movable in rotation about the longitudinal axis Y-Y.

The body of the valve is not shown in the figure.

The plug 1 as shown comprises a plate 11 in the form of a disk that extends radially around the longitudinal axis Y-Y.

The plug 1 also has an index portion constituted in this example by a first ramp 3 and a second ramp 4, both ramps 3 and 4 being arranged around the longitudinal axis Y-Y and extending in the same direction from the plate 11, but they are oppositely handed about the longitudinal axis Y-Y.

In the example shown, the first ramp 3 is arranged around the longitudinal axis Y-Y and slopes away from the plate 11 in a clockwise direction of rotation.

The second ramp 4 is arranged around the first ramp 3 and slopes away from the plate 11 in a counterclockwise direction of rotation.

The two ramps 3 and 4 are thus coaxial, the first ramp 3 in this example being arranged between the longitudinal axis Y-Y and the second ramp 4. In the example shown, each of the ramps 3 and 4 forms one complete revolution around the longitudinal axis Y-Y.

FIG. 2 is a view of an example blocker part 5 for the plug 1 shown in FIG. 1.

The blocker part 5 as shown is adapted to slide along the longitudinal axis Y-Y so as to come into contact selectively with the plug 1 in order to enable it to be prevented selectively from turning about the longitudinal axis Y-Y.

As shown, the blocker part 5 comprises an inner sheath 6 and an outer ring 7 arranged around a portion of the inner sheath 6.

When the blocker part 5 is formed in this way of two elements, the inner sheath 6 and the outer ring 7, include means for indexing turning about the longitudinal axis Y-Y, e.g. a spline/groove pair arranged in these two elements, together with means providing indexing for movement in translation along the longitudinal axis Y-Y or an abutment that limits such movement.

The blocker part 5 has first and second index portions 8 and 9 adapted to come into contact selectively with the first and second ramps 3 and 4 respectively.

In the example shown, the first index portion 8 comprises two spiral portions 81 and 82 arranged on opposite sides of the longitudinal axis Y-Y. Likewise, in the example shown, the second index portion 9 comprises two spiral portions 91 and 92 arranged on opposite sides of the longitudinal axis Y-Y.

As explained below, these spiral portions 81, 82, 91, and 92 are dimensioned in such a manner as to come into contact with the first and second ramps 3 and 4 when the blocker part 5 is caused to bear against the plug 1.

It is also possible for the index portions 8 and 9 to be embodied in other ways; by way of example, each of them may be formed by a single spiral portion, or by multiple spiral portions, or indeed by portions providing point contacts or line contacts with the first and second ramps 3 and 4.

FIGS. 3 to 5 show the interaction between the plug 1 and the blocker part 5 as described above.

FIG. 3 shows the plug 1 together with the blocker part 5 mounted on the longitudinal axis Y-Y of the plug 1.

The blocker part 5 is then held at a distance from the plug 1, so as not to make contact with its plate 11 or with its ramps 3 and 4.

The plug 1 is then free to turn about the axis Y-Y relative to the blocker part 5.

As can be seen in FIGS. 3, 4, and 5, in the embodiment shown, the inner sheath 6 has a longitudinal spline 61 co-operating with a longitudinal groove 71 in the outer ring 7 in order to lock the inner sheath 6 in rotation relative to the outer ring 7.

FIGS. 4 and 5 show the inner sheath 6 and the outer ring 7 of the blocker part 5 put into contact with the ramps 3 and 4 of the plug 1, e.g. by a blocking mechanism or else manually by a user.

It can readily be understood that the inner sheath 6 and the outer ring 7 of the blocker part 5 make contact with the plug 1 simultaneously; FIGS. 4 and 5 seek only to show details of operation.

As can be seen in FIG. 4, when the outer ring 7 makes contact against the plug 1, the second index portion 9 comes into contact with the second ramp 4. By being put into contact in this way, the second index portion 9 and the second ramp 4 serve to lock turning of the plug 1 about the longitudinal axis Y-Y in a first direction of rotation, namely the clockwise direction in the embodiment shown. The index portions 91 and 92 are typically ramp portions that are complementary to the second ramp 4.

Specifically, the structure of the second ramp 4 with a sloping surface that departs progressively from the plate 11 of the plug 1 implies that turning in the clockwise direction will give rise to an axial movement of the outer ring 7 away from the plate 11 of the plug 1.

However, the blocker part 5 is provided with an axial abutment or is locked against movement in translation by a mechanism that prevents such axial movement, thereby locking turning of the plug 1 about the longitudinal axis Y-Y in a first direction of rotation, namely the clockwise direction in the embodiment shown.

Similarly, and as can be seen in FIG. 5, when the inner sheath 6 makes contact against the plug 1, the first index portion 8 comes into contact with the first ramp 3. By being put into contact in this way, the first index portion 8 and the first ramp 3 lock turning of the plug 1 about the longitudinal axis Y-Y in a second direction of rotation opposite to the first direction of rotation, i.e. the counterclockwise direction in the embodiment shown. The index portions 81 and 82 typically form ramp portions that are complementary to the first ramp 3.

Specifically, the structure of the first ramp 30 with a sloping surface that departs progressively from the plate 11 of the plug 1 implies that counterclockwise turning will give rise to axial movement of the inner sheath 6 going away from the plate 11 of the plug 1.

However, the blocker part 5 has an axial abutment or is locked against movement in translation by the mechanism that prevents such axial movement, thereby ensuring that the plug 1 is prevented from turning about the longitudinal axis Y-Y in a second direction of rotation, namely the counterclockwise direction in the embodiment shown.

On reading the above, it can be understood that providing two ramps 3 and 4 that slope away from the plate 11 of the plug 1 in opposite directions of rotation about the longitudinal axis Y-Y makes it possible to provide complete locking against turning about the longitudinal axis Y-Y, with each of the ramps 3 and 4 co-operating with respective index portions 8 and 9 to provide locking in one direction of rotation about the longitudinal axis Y-Y.

The proposed systems thus makes it possible in reliable manner to cause a valve to be held in a desired position after a calibration operation on the ground, thus enabling the valve to be maintained in this position on a vehicle that is in operation.

Furthermore, the proposed structure is flexible, the index portions and the ramps being capable of adapting to the position of the plug 1.

Furthermore, the system is simple in structure, involving a limited number of parts of small volume, and thus involving a total weight that is limited compared with a conventional locking system, which is very advantageous in particular for space applications, in which criteria concerning weight, size, and reliability are fundamental.

The invention claimed is:

1. A system for blocking a plug valve, the system comprising:
    a plug that is movable in rotation about a longitudinal axis and that is rotatably connected to a valve body, the plug presenting a shaft extending along the longitudinal axis; and
    a blocker part mounted to be movable in translation along the longitudinal axis;
    wherein
        the plug presents an index portion comprising a first ramp and a second ramp, the two ramps being arranged around the shaft, extending in the same direction and having oppositely-handed slopes about the shaft; and the blocker part presents first and second index portions adapted to come selectively into contact with the first and second ramps, respectively;

the blocker part being configured so as to be capable of being positioned selectively in:
- a free position, in which the blocker part is not in contact with the ramps of the plug; and
- a locking position in which the first and second index portions are respectively in contact with the first and second ramps, such that the first ramp (3) and the first index portion prevent the plug from turning about the longitudinal axis in a first direction of rotation, and the second ramp and the second index portion prevent the plug from turning about the longitudinal axis in a second direction of rotation, opposite to the first direction of rotation.

2. A system according to claim 1, wherein the index portion of the plug comprises a plate arranged on the shaft and extending radially around the shaft, the first and second ramps extending over a surface of said plate, said ramps being arranged concentrically around the shaft.

3. A system according to claim 1 or claim 2, wherein the first index portion has a contact surface forming a ramp portion that is complementary to the first ramp, and the second index portion has a contact surface forming a ramp portion complementary to the second ramp.

4. A system according to claim 1 or claim 2, wherein the first index has two contact surfaces, each forming a ramp portion complementary to the first ramp, and the second index portion has two contact surfaces, each forming a ramp portion complementary to the second ramp.

5. A system according to claim 4, wherein the two contact surfaces of the first index portion are arranged on opposite sides of the longitudinal axis, and the two contact surfaces of the second index portion are arranged on opposite sides of the longitudinal axis.

6. A system according to claim 1, including a blocking mechanism for preventing the blocker part from moving in translation in a longitudinal direction defined by the longitudinal axis.

* * * * *